US005216793A

United States Patent [19]

Semotiuk

[11] Patent Number: 5,216,793

[45] Date of Patent: Jun. 8, 1993

[54] HOSE FITTING REMOVAL APPARATUS

[76] Inventor: Robert A. Semotiuk, 2633 Tweedsmuir Avenue, Prince George, B. C., Canada, V2N 1E8

[21] Appl. No.: 799,406

[22] Filed: Nov. 27, 1991

Related U.S. Application Data

[63] Continuation-in-part of Ser. No. 581,639, Sep. 12, 1990, Pat. No. 5,068,953.

[51] Int. Cl.[5] .............................................. B23P 19/04

[52] U.S. Cl. ........................................ 29/235; 29/239; 29/275

[58] Field of Search ................. 29/275, 234, 235, 239, 29/426.4, 426.5, 426.6, 453; 81/9.3, 3.4; 285/39

[56] References Cited

U.S. PATENT DOCUMENTS

| | | | |
|---|---|---|---|
| 2,371,805 | 3/1945 | Cooper | 81/9.3 X |
| 3,038,178 | 6/1962 | Schumacher | 81/3.4 X |
| 3,087,364 | 4/1963 | Witmer | 29/426.5 X |
| 4,213,216 | 7/1980 | Strybel | 29/235 X |
| 4,273,134 | 6/1981 | Ricciardelli | 29/453 X |
| 4,380,860 | 4/1983 | Riester et al. | 29/453 |
| 4,535,521 | 8/1985 | Ver Planck | 29/235 |

FOREIGN PATENT DOCUMENTS

| | | | |
|---|---|---|---|
| 1186454 | 10/1985 | U.S.S.R. | 29/235 |

*Primary Examiner*—Timothy V. Eley
*Assistant Examiner*—C. Richard Martin
*Attorney, Agent, or Firm*—Barrigar & Oyen

[57] ABSTRACT

This invention relates to a novel apparatus which is useful for readily removing the fitting from a hose, particularly a hydraulic hose. An expansion guide for fitting on the end of a hose to enable a fitting at the opposite end of the hose to be loosened comprising a hollow cylinder open at both ends, the opening at one end being of a diameter greater than the outer diameter of the hose, and the opening at the other end being narrower than the outer diameter but greater than the interior diameter of the hose, the interior of the cylinder having an annular ledge at the narrower end, the ledge being adapted to fit at the end of the hose.

18 Claims, 5 Drawing Sheets

HOSE FITTING REMOVAL APPARATUS

This is a continuation-in-part of U.S. application Ser. No. 07/581,639, filed Sep. 12, 1990, now U.S. Pat. No. 5,068,953.

FIELD OF THE INVENTION

This invention relates to a novel apparatus which is useful for readily removing a fitting from a hose, particularly a hydraulic hose.

BACKGROUND OF THE INVENTION

The typical fitting on the end of a hydraulic hose connection consists of a cylindrical stem which penetrates into the interior of the hose, and fingers, usually eight, which extend longitudinally along the exterior of the hose. An outer sleeve fits over the fingers and protects the fingers from damage. In use, the fitting usually outlasts the hose, which typically bursts under prolonged use. Intact removal of a fitting from the end of a burst hydraulic hose, so that the fitting can be reinstalled on the end of a new hydraulic hose, is a difficult longstanding problem in the hydraulic hose industry. It is commonplace for hydraulic hoses to burst after a period of use under the high pressures associated with hydraulic hoses and pumps, in high pressure hydraulic equipment. Particularly in remote areas, where hydraulic hoses and pumps are used on earth moving equipment, and replacement fittings are not readily available, it is important to be able to cleanly remove a fitting from the end of a burst hydraulic hose, and to be able to reuse the fitting by installing it on the end of a new hose.

The fitting on a hydraulic hose is installed under very high pressures to ensure that the joint stands up to the high pressures exerted in the hydraulic system. Because of this, the fitting and fingers grasp the hose very securely, and it is not easy to remove the fitting from the hose, without causing damage to the fitting. If chisels are used to spread the fingers of the hydraulic fitting, scores frequently occur to the fingers, or on the internal stem. It is important in the removal of a fitting, that the fingers and the stem are not scored. Scores in the stem, in particular, cut the inside liner of the new hose, thereby leading to premature failure of the hose.

Numerous attempts have been made over the years to devise devices which will readily and cleanly remove the fittings from hydraulic hoses.

A process commonly in use for fitting removal involves cutting the hose squarely approximately 2.75" to 3.00" from the end of the fitting. A pusher is inserted into the interior of the hose. The cut hose with pusher is put into a proper size collet to retain the sleeve of the fitting while force is applied on the pusher. The force on the pusher plate compresses the hose outwardly, thereby usually causing the fingers on the fitting to flare. However, frequently the hose, when it flares out, does not expand the fingers of the fitting. The hose can be worn out due to its use. In many instances, the hose tends to burst proximate to the fitting. The required cut-off length cannot then be achieved. If the cut-off length is too short, the pusher plate will contact the end of the hose stem and the eight fingers, and usually damage them, if force is applied.

Scudieri, U.S. Pat. No. 3,130,493, Apr. 28, 1964, shows a collar which fits over a hydraulic hose and when a force is applied to the end of the collar, the fingers of the hose fitting are induced to flare outwardly in a curled manner. With this device, contact is made with the ends of the fingers of the fitting. The chance of damage occurring to the ends of the fingers by using this device, before the fingers are spread outwardly, are reasonably high. Considerable force must be initially applied to the ends of the fingers of the fitting, which can cause damage before the fingers are urged to curl outwardly and spread. In the Scudieri design, it is also not certain that the fingers of the fitting will not simply collapse when a force is applied at the remote end of the collar. One or more of the fingers may simply shrivel, rather than spread outwardly in a smooth manner. Scudieri includes a raised curved interior rim, which is designed to induce the ends of the fitting fingers to spread outwardly, but it is not evident that the spreading action will occur smoothly without damage to the ends of the fingers. Scudieri does not utilize a hose flare or balloon action to persuade the fingers to be spread outwardly. Further, Scudieri does not include a rod which is inserted into the interior of the hose to prevent the hose from collapsing internally.

Bagby, U.S. Pat. No. 3,787,950, Jan. 29, 1974, shows a rod and flange combination which are used to push the fitting off the end of the hydraulic hose. Bagby includes a hose grip which purportedly holds the hose securely. However, since tremendous forces are required in order to push a fitting off the end of a hydraulic hose, it is not clear that the grip will hold the hose securely under such tremendous forces. Bagby includes teeth on the interior of his gripping mechanism but it is doubtful those teeth will exert a strong enough gripping action to withstand the forces required in order to push the fitting from the end of the hose. Bagby discloses a rod which fits inside the hose, the rod being used to push the interior portion of the fitting (the stem) in a direction away from the end of the hose. Since the rod, which has a plunger at the end, impinges on the interior stem of the hose fitting, there is a good chance that under the high forces utilized, damage to the stem of the fitting will occur. Then, if the fitting is successfully removed, and installed on a new hose, the damaged ends of the stem will score the interior of the hydraulic hose, which will ultimately lead to premature failure of the new hose.

Strybel, U.S. Pat. No. 4,213,216, granted Jul. 22, 1980, discloses a service tool structure for use in servicing charging hose and fittings provided with adjustable core depressors for controlling the valve means thereof. Strybel's service tool provides simplified installation and removal of the end-fitting gaskets. His service tool also provides facilitated adjustment of the adjustable "depressor" and may include means defining a "storage cavity" for maintaining spare gaskets and core depressors.

The Strybel invention relates to the servicing of a "low-pressure", "crimped" hose and valve assembly used on air lines, fuels and/or gages such as propane, natural gas, nitogen and helium, as shown in FIGS. 4, 14, and 16, and in the illustrated embodiment. The hose coupling includes a nipple 14 installed on the distal end 15 of a hose, such as an air hose, as by suitable "crimped" connector 16. Strybel's tool is therefore useful for tubed tires with valves.

SUMMARY OF THE INVENTION

The invention is directed to an expansion guide for fitting on the end of a hose to enable a fitting at the opposite end of the hose to be loosened comprising a hollow cylinder open at both ends, the opening at one end being of a diameter greater than the outer diameter of the hose, and the opening at the other end being narrower than the outer diameter but greater than the interior diameter of the hose, the interior of the cylinder having an annular ledge at the narrower end, the ledge being adapted to fit at the end of the hose.

The plane of the ledge may be angled radially downwardly in the direction of the end of the hollow cylinder having the narrower diameter opening. The interior of the greater diameter portion of the hollow cylinder can be tapered outwardly from the outer diameter of the ledge to the end of the hollow cylinder having the greater opening.

The invention is also directed to a method of spreading fingers integral to a hydraulic fitting with an internal stem to thereby enable the fitting to be loosened and removed from the end of the hose which comprises cutting the hose at right angles a predetermined distance from the end of the fitting and placing a hollow cylindrical shaped expansion guide over the cut end of the hose, and over a portion of the body of the hose, the expansion guide leaving a length of exposed hose between the expansion guide and fitting, the end of the expansion guide remote from the fitting being of a diameter narrower than the outer diameter of the hose, applying a force at the narrow end of the expansion guide remote from the fitting and an equal force at the end of the fitting removed from the expansion guide, to thereby compress the length of the hose and force the exposed part of the hose to balloon between the expansion guide and the fitting and thereby force the fingers of the fitting to flare radially outwardly.

The interior of the expansion guide may have an outwardly tapered opening at one end sized to fit over the outer diameter of the cut end of the hose and may be narrower at the opposite end so as to enable the narrow end to abut the cut end of the hose.

The narrow end of the expansion guide may have an opening therein and a rod may be inserted through the opening in the narrower end of the expansion guide into the interior of the hose to prevent the hose from collapsing inwardly when force is applied on the end of the expansion guide removed from the fitting.

DRAWINGS

In drawings which illustrate specific embodiments of the invention, but which should not be construed as restricting or limiting the scope of the invention in any way:

DETAILED DESCRIPTION OF SPECIFIC EMBODIMENTS OF THE INVENTION

Figure 3:
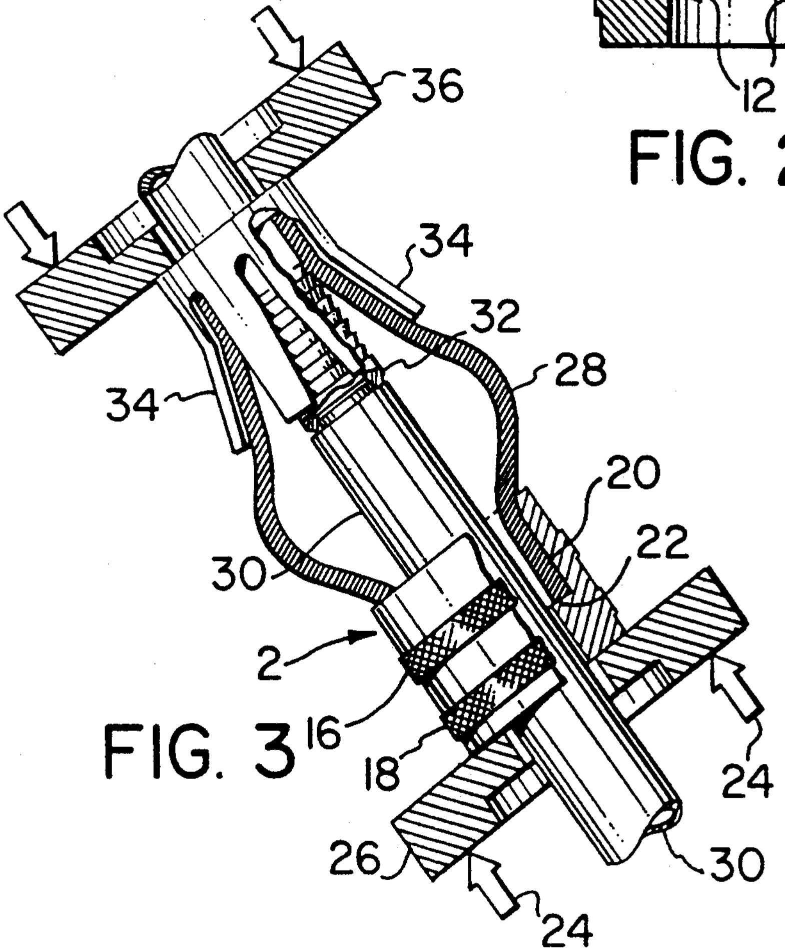
FIG. 3 illustrates a side perspective partially cut-away view of the hose fitting removal apparatus mounted on a hose and inducing the fingers of the fitting to spread.
Figure 4:
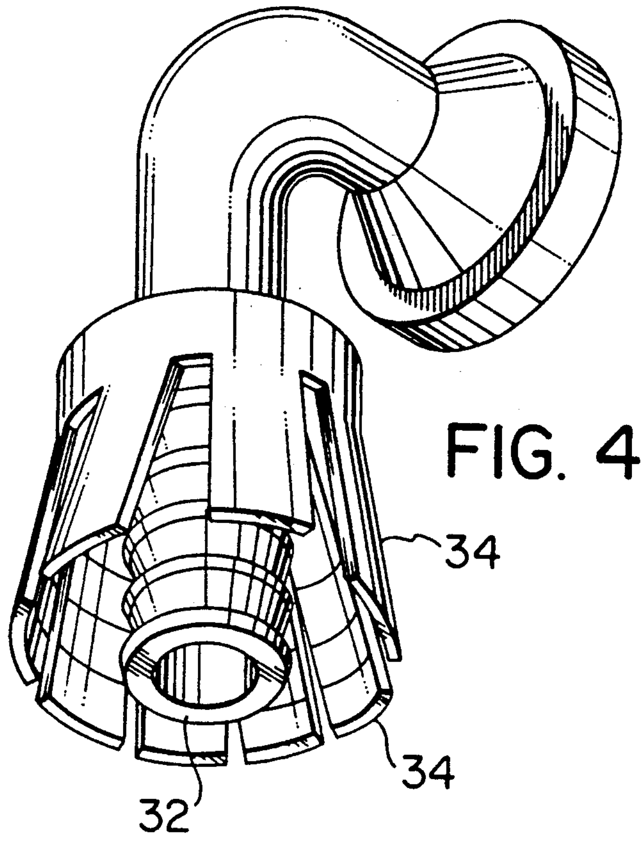
FIG. 4 illustrates an isometric view of a fitting with stem and flared fingers.
Figure 6:
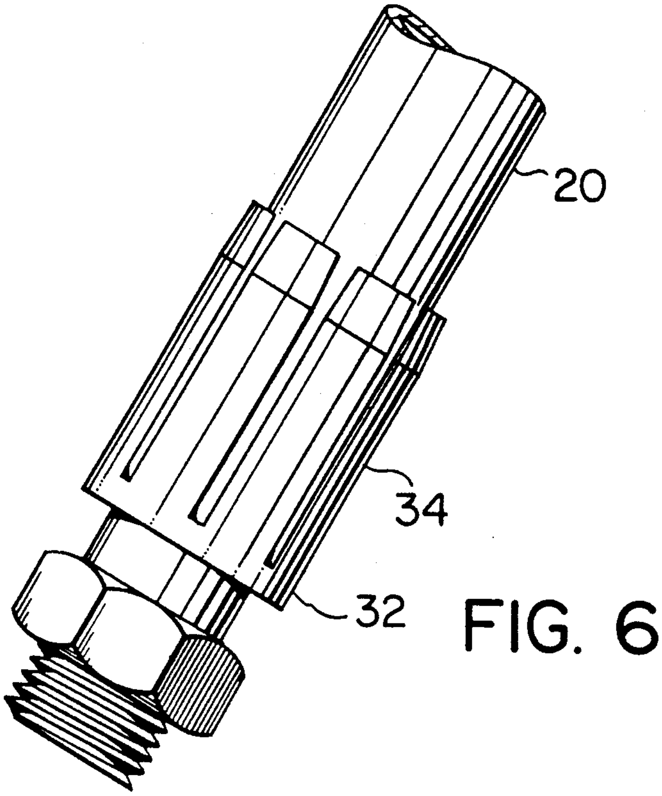
FIG. 6 illustrates a side view of a fitting installed on a hydraulic hose ready to receive a collar over the fitting fingers.
Figure 7:
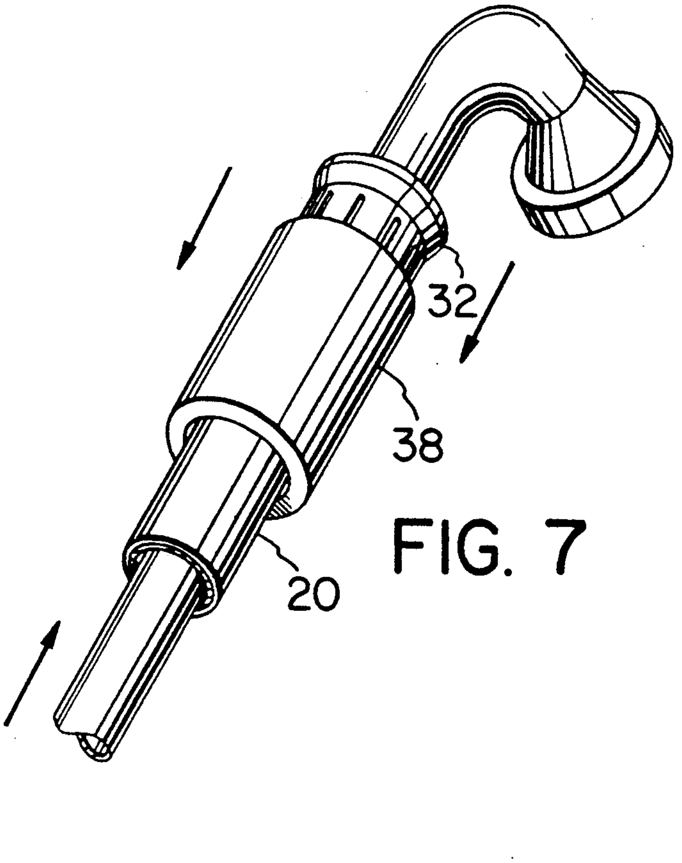
FIG. 7 illustrates an isometric view of a hydraulic hose with a stem pusher inserted in it and a sleeve being positioned over the fingers of the fitting fingers.

The invention, which is referred to as an expansion guide, relates to a process and apparatus for removing the assembled hydraulic hose and fittings on all industrial hydraulic equipment but notably Caterpillar or equivalent style fittings XT3, XT5, and XT6. CATERPILLAR is a trademark of Caterpillar Inc., of Peoria, Ill. The Caterpillar XT3, XT5 and XT6 fittings refer to model numbers and are similar in construction, but vary in size from one another. The typical Caterpillar XT fitting is shown in FIG. 3 (stem 32 which fits inside hose 20, and fingers 34, which grasp the exterior of the hose 20) without the standard protective sleeve. FIG. 4 shows a pipe and coupling as well as the fitting. FIG. 6 shows hose 20 inserted between the fingers 34 and stem 32 (not visible). FIG. 7 also shows the protective sleeve 38, which protects the fingers 34 grasping the exterior of the end of the hose. When the Caterpillar XT fitting is installed, it appears as the fitting shown in FIG. 7, with the sleeve protecting the fingers 34. The expansion guide is of various sizes and has assorted inside and outside diameters corresponding to the hose size that is being worked on.

The expansion guide of the invention provides a hose retaining system which enables the pushing, retaining and expansion of the hose outwardly on the fitting fingers in one process. The invention after the outer sleeve has been removed causes the hose to expand or balloon which spreads the fingers of the fitting evenly and accurately outward. This action loosens the hose from the fingers and the stem, and enables the fitting to be readily separated from the hose.

Figure 1:
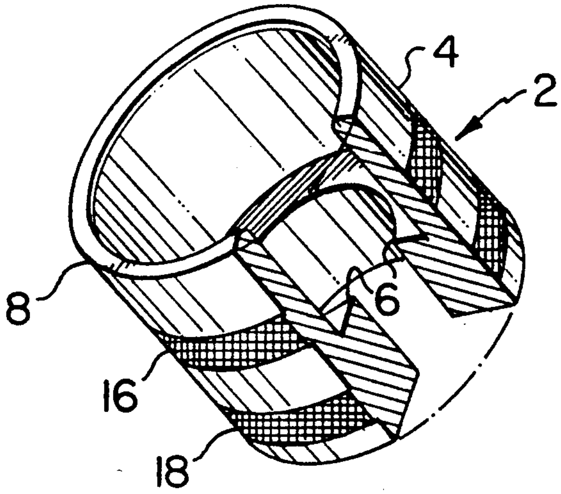
FIG. 1 illustrates an isometric partial cut-away view of the hose fitting removal apparatus.

Referring to the drawings, FIG. 1 illustrates an isometric partially cut-away view of the expansion guide. The guide 2 is constructed in the form of a hollow cylinder body 4 which has an annular ledge 6 in the interior of the body 4. The top rim 8 of the guide 2 is rounded to facilitate the guide 2 being slid over the cut end of a hydraulic hose.

Figure 2:
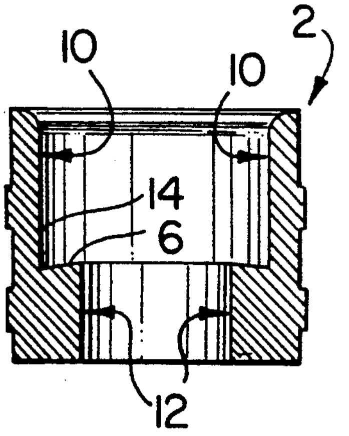
FIG. 2 illustrates a section view along section line A of FIG. 1.

FIG. 2 illustrates a section view taken along section line A of FIG. 1. The guide 2 has an upper internal diameter 10 which corresponds generally to the outer diameter of the hose over which the guide 2 is to be inserted. The internal diameter 12 of the lower portion of the guide 2 below the ledge 6 is substantially less than the outer diameter of the hose and slightly larger than the outside diameter of the stem pusher 30 (see FIG. 3). Thus the circular ledge 6 is designed to abut the circular cut end of a hydraulic hose.

As seen in FIG. 2, the ledge 6 is angled radially downwardly to the exterior about 5°. This 5° angle provides some "play" between the cut end of the hose and the ledge 6 and permits the cut end of the hose to migrate slightly outwardly on the ledge 6 if the end of the hose has projections or is not accurately square cut. Tests conducted with an axially perpendicular ledge have demonstrated that the hose jams into the expansion guide after force is applied. It is then extremely difficult to remove the hose from the expansion guide.

If the ledge angle is too great, i.e. 20° to 30°, then the ledge 6 does not apply a proper generally perpendicular force in the axial direction against the end of the hose, when force is applied on the ram head 26 (see FIG. 3). A ledge angle of about 5° to 10° is advantageous because it prevents jamming of the hose within the expansion guide and deters the cut end of the hose from collapsing inwardly.

The upper interior wall 14 of the guide 2 is tapered outwardly about 5° in an upward direction. This facilitates the fitting of the expansion guide 2 over the hose and also minimizes jamming of the hose within the expansion guide 2 after force has been applied. Tests conducted with a straight constant diameter inner wall have demonstrated that the hose tends to jam in the expansion guide, after a force has been applied. It is thereafter very difficult to extract the hose from the expansion guide.

The exterior of the guide 2 is knurled at two locations 16 and 18 to enhance grippability of the exterior of the guide 2. This is helpful in cases where the operators' hands are wet or greasy.

The guide 2 presents an entirely new approach to solving a serious problem, that is, providing a reliable apparatus and system whereby the hose can be expanded under control within the chamber between the fingers and the stem, without damaging the fitting. The process creates an expansion action, not a compression action. No direct contact with the fitting is made, thereby eliminating the possibility that damage to the fitting will occur.

As seen in FIG. 3, the expansion guide 2 is fitted over the end of the hose 20, after the sleeve (not shown) over the fingers 34 has been removed, which has had its end 22 square cut at a length which is about double to two and half times the length of the expansion guide 2. When a force 24 as shown by the arrows is applied to the end of the expansion guide 2, by a hydraulic ram head 26, the hose 20, by the compression action, is forced to balloon outwardly in a smooth curve at point 28. A stem pusher 30 is inserted through the opening 12 at the end of the expansion guide 2 into the interior of the hose 20 to prevent the hose collapsing inwardly. The stem pusher 30 abuts the end of the fitting stem 32. The ballooning action of the hose 20 at point 28 forces the eight fingers 34 of the fitting to flare outwardly. This releases the end of the hose 20 under the fingers 34 so that the hose 20 can be readily removed from between the stem 32 and the fingers 34. As seen in FIG. 3, the end of the fitting opposite the fingers 34 is held by a plate 36, to provide a base against which the force of the ram 26 can bear. The result is an even and accurate speed setting of the eight fingers 34. They can then be readily forced back against the exterior of a new hose installed over the stem 32.

The expansion guide 2 can be used in association with Caterpillar XT-3, XT5 and XT6 high pressure hydraulic hose and existing hardware systems and related tooling to remove, dismantle and repair a hose. The fitting assembly does not require any changes of procedure with existing Caterpillar hydraulic hose systems and is compatible with safety guidelines as outlined in their manual.

Figure 5:
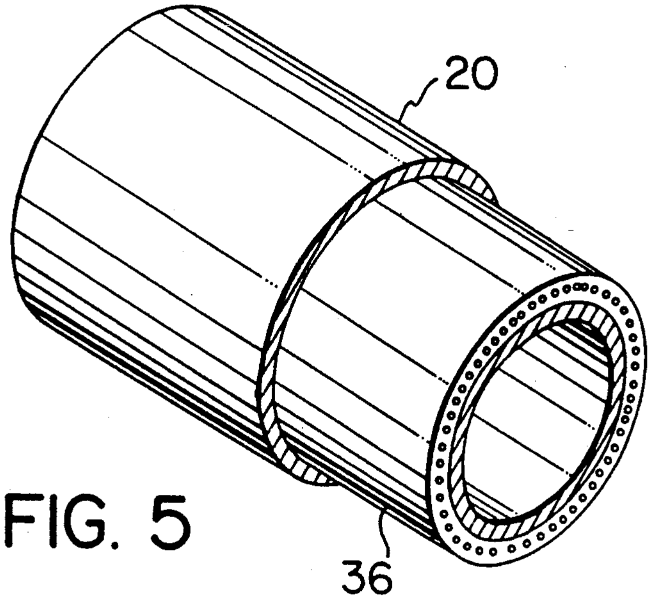
FIG. 5 illustrates an isometric view of a hydraulic hose with a skived portion adapted to receive the fingers of a fitting.

FIG. 4 is an isometric illustration of a high pressure hydraulic fitting 32, with all eight fingers 34 spread apart evenly and accurately, ready to receive a hose for final assembly. The high pressure hose 20, as depicted in FIG. 5, has been skived to a predetermined length (see 36) to be received by the high pressure fitting. FIG. 6 illustrates a side view of the skived hose 20 as shown in FIG. 5. The hose 20 has been inserted into the high pressure fitting 32 and all eight fingers 34 have been forced flat, ready to receive the sleeve of the fitting. FIG. 7 illustrates an isometric view of a hose 20 with the stem pusher 30 in one end and a sleeve 38 being fitted over the fingers of the fitting 32.

Figure 8:
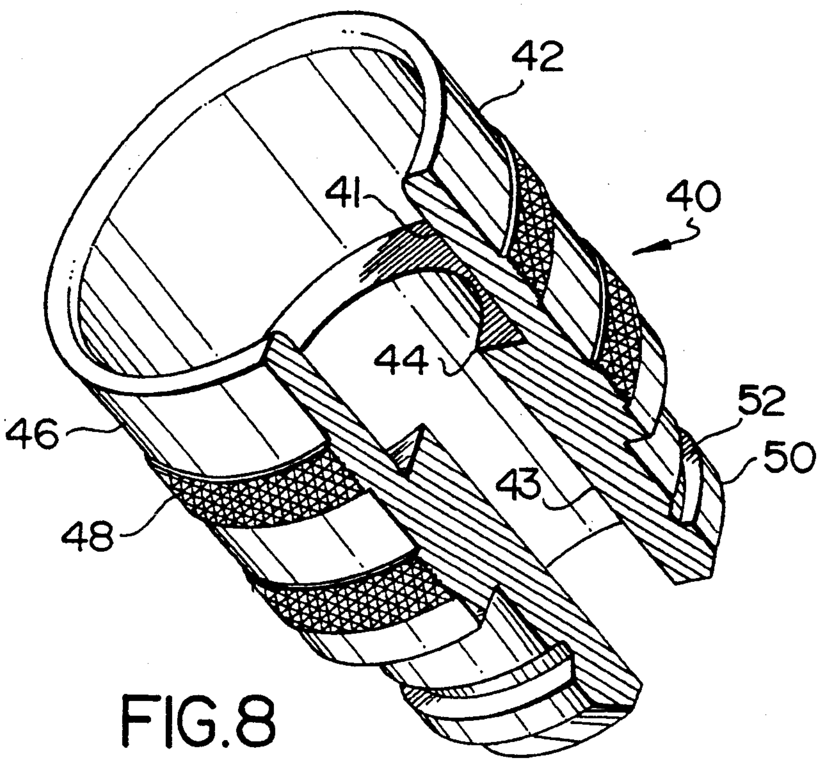
FIG. 8 illustrates an isometric partial cut-away view of an alternative embodiment of the hose fitting removal apparatus.

FIG. 8 illustrates an isometric partial cut-away view of an alternative embodiment of the hose fitting removal apparatus 40. The modified guide 40 is constructed in the form of a hollow cylinder body 42 which has an annular ledge 44 in the interior of the body 42. The top rim 46 of the guide 40 is rounded to facilitate the guide 40 being slid over the cut end of a hydraulic hose. The exterior of the guide 40 has two circumferential knurled areas 48 to enhance gripability of the exterior of the guide 40. This is helpful in cases where the operator's hands are wet or greasy. In all of the foregoing respects, the modified version of the guide 40 resembles the basic expansion guide 2 illustrated in FIGS. 1 through 6 inclusive.

The guide 40 illustrated in FIG. 8 is modified by having a protrusion 50 extend from one end of the guide 40. This protrusion 50 has a smaller diameter than the main body of the guide 40 and has machined in the exterior circumferential surface thereof a groove 52.

Figure 9:
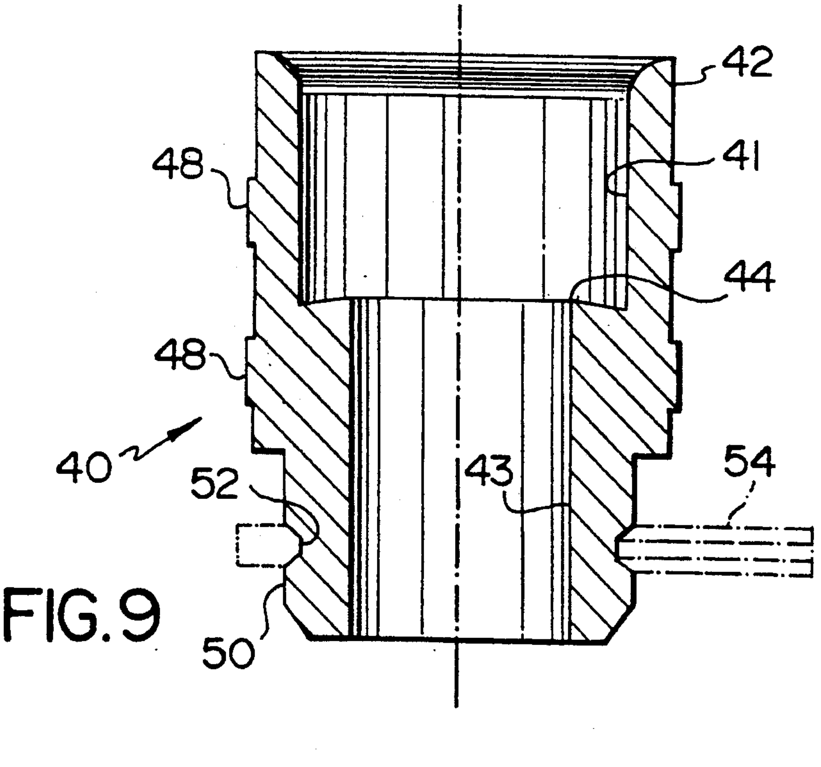
FIG. 9 illustrates a section view along section line A of FIG. 8.

FIG. 9 illustrates a section view taken along section line A of FIG. 8. As can be seen, the modified construction illustrated in FIG. 9 is similar to that of the expansion guide illustrated in FIG. 2. The guide 40 has an upper internal diameter 41 which corresponds generally to the outer diameter of the hose over which the guide 40 is to be inserted. The internal diameter 43 of the lower portion of the guide 40 below the ledge 44 is substantially less than the outer diameter of the hose and slightly larger than the outside diameter of the stem pusher 30 (see FIG. 3). Thus the circular ledge 44, as with the other version of the guide 2, is designed to abut the circular cut end of a hydraulic hose. The internal diameter of the protrusion 50 is contiguous with internal diameter 43. The external diameter of the protrusion 50 is less than the external diameter 42 of the guide 40.

FIG. 9 also illustrates in dotted section lines snap-lock pusher plate 56, which will be discussed in more detail below in association with FIGS. 10 through 15 inclusive one snap-lock pusher plate 54 snaps in place in groove 52 around the circumference of protrusion 50.

Figure 10:
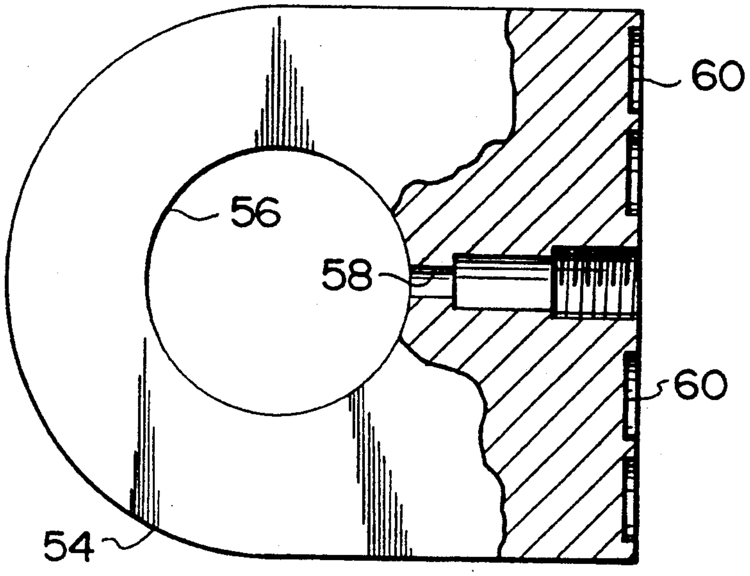
FIG. 10 illustrates a plan view of a pusher plate.

FIG. 10 illustrates a front enlarged view of the snap-lock pusher plate 54. The pusher plate 54 has a general "U" shape, with a hole 56 machined in the centre of the hole. This hole 56 is machined to fit over protrusion 50 of modified guide 40 and snap in place in groove 52 of protrusion 50. At one side thereof, pusher plate 54 has machined therein a cylindrical bore hole 58, which is adapted to hold a pin, screw and compression spring in order to provide a snap-lock assembly.

Figure 11:
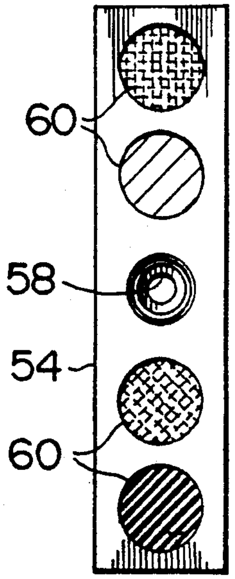
FIG. 11 illustrates an end view of the pusher plate.

FIG. 11 illustrates an end view of a the flat side of the snap-lock pusher plate 54. The bore hole 58 is shown in the central area thereof. The flat side of the snap-lock pusher plate 54 has four circular areas 60 recessed therein. Each of these four circular areas 60 can be colour coded according to different caterpillar type fittings. This colour coding system will facilitate use of the snap-lock pusher plate 54 and guide 40 by the operator. Typical colour coding would be yellow, bronze, orange and dark brown.

Figure 12:
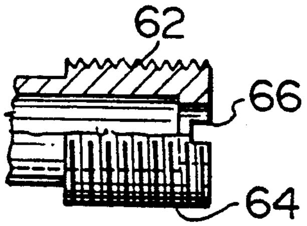
FIG. 12 illustrates a side partial section view of a screw.
Figure 13:
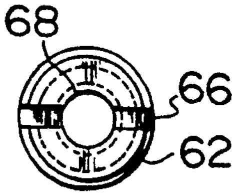
FIG. 13 illustrates an end view of the screw.
Figure 14:
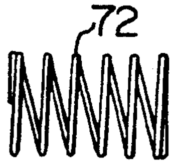
FIG. 14 illustrates a side view of a coil spring.
Figure 15:
FIG. 15 illustrates a side view of a pin.

FIGS. 12, 13, 14 and 15 illustrate the components of the snap-lock assembly. FIG. 12 illustrates a side partial section view of the screw 62 which has male threads 64 machined in the exterior surface thereof. A conventional screw slot 66 is machined in the end of screw 62. FIG. 13 illustrates an end view of the screw 62, with screw slot 66 in the end thereof. The screw 62 has a cylindrical opening 68 therethrough, the opening 68 being adapted to receive the pin 70 which is illustrated in FIG. 15. Compression spring 72, as illustrated in side view in FIG. 14, fits around the circumference of pin 70 and in the interior of bore hole 58 in snap-lock pusher plate 54. The screw 62 is then threaded into the end of hole 58. The compression spring 72 permits the pin 70 to reciprocate back and forth on application of pressure. This assembly provides a snap-lock mechanism whereby pusher plate 54 can be installed or removed from protrusion 50 of modified guide 40.

The expansion guide has many special features within its body design, some of which are of importance to its performance. Some of these are listed below:

1. The slight outward taper of the inner wall 14 of the expansion guide 2 eases the installation and removal of the hose.
2. A radius curved relief 8 on the inside receiving throat of the expansion guide 2 eases insertion of a hose into the expansion guide.
3. A slight outward downward taper of approximately 5 degrees is incorporated in the ledge 6 of the main body seat area. This minimizes any binding of wire braid from the hose 20 to both the inner wall 14 of the guide and the pusher rod 30.
4. The double knurled areas 16 and 18 on the exterior of the guide assist hand grip, for ease of removal;
5. Each size of expansion guide can be clearly identified by colour coding according to hose dimensions. In addition, all expansion guides can be size stamped. For example, No. 16 would be for a 1" inner diameter hose.

The expansion guide, according to the invention, has a number of distinct advantages, some of which are as follows:

1. Time and labour savings in the removal and preparation of hoses and fittings;
2. Ease of application;
3. Increased life span of the high pressure reusable fitting;
4. Increased safety to personnel; and
5. Reduced inventory costs.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An expansion guide for fitting on an end of a hose to enable a mechanical fitting at an opposite end of the hose to be loosened comprising a hollow cylinder open at both ends, the cylinder having a main body with a first opening at one axial end thereof and at the second axial end thereof a protrusion which has a second opening axially opposite the first opening, the first opening being circular and adapted to fit over the end of the hose, and the second opening at the end of the protrusion axially extending from the main body being smaller in diameter than the diameter of the first opening, the interior of the cylinder having an annular ledge facing in the direction of the first opening and adapted to abut the end of the hose, the diameter of the exterior of the protrusion being of smaller diameter than the diameter of the main body, the protrusion having a groove around the circumference thereof between the main body and the end of the protrusion.

2. A guide as claimed in claim 1 wherein a radially interior free edge of the ledge is at a greater distance from the second opening than the region where the exterior radius of the ledge meets the interior of the main body so that the ledge is angled radially in the direction of the second opening.

3. A guide as claimed in claim 2 wherein the interior of the larger diameter portion of the hollow cylinder is tapered outwardly from the exterior radius of the ledge to the end of the first opening.

4. An apparatus for fitting on an end of a hose to enable a finger fitting at an opposite end of the hose to be loosened by forcing the apparatus in the direction of the fitting and enlarging the hose comprising a hollow cylinder open at each of a first axial end and a second axial end, the opening at the first end being circular and of a diameter greater than the diameter of the opening at the second end, the interior of the cylinder having therein an annular ledge, the interior free edge thereof being contiguous with the opening of smaller diameter at the second end, the ledge being angled radially inwardly to the axial centre and in the direction of the first end of the hollow cylinder having the greater diameter opening, the cylindrical walls of the interior of the greater diameter portion of the hollow cylinder between the ledge and the first end being tapered diametrically outwardly from the outer diameter of the ledge to the inner diameter of the greater opening of the first end of the hollow cylinder, the exterior of the cylinder in the region of the second opening being of lesser diameter than the diameter of the cylinder in the region of the first opening, to thereby form a cylindrical protrusion with a groove around the circumference of the protrusion.

5. An apparatus as claimed in claim 4 wherein the greater diameter opening at the first end of the guide has a rounded rim.

6. An apparatus as claimed in claim 4 wherein the taper from the ledge to the edge of the first end of the guide follows a straight line.

7. An apparatus as claimed in claim 6 wherein the guide has a knurled exterior surface.

8. An apparatus as claimed in claim 6 wherein the angle of the ledge is within the range of about 5° to about 10° from the radial plane.

9. An apparatus as claimed in claim 8 wherein the taper of the interior cylindrical walls is about 5° from the axis of the apparatus.

10. An apparatus for fitting on an end of a hose to enable a finger fitting at an opposite end of the hose to be loosened by forcing the apparatus in the direction of the fitting and thereby enlarging the hose comprising a hollow cylinder with a first opening at a first axial end and a second opening at a second axial end, the first opening being circular and of a diameter greater than the diameter of the second opening, the second end with the second opening being planar in a radial direction, a stem pusher extending into said second end and out of said first end and abutting against said finger fitting, the interior of the hollow cylinder having an annular ledge contiguous with the second opening at the second end, the ledge being angled radially inwardly to the axial centre and in the direction of the first end of the hollow cylinder having the greater diameter first opening, the cylindrical walls of the interior of the greater diameter portion of the hollow cylinder between the ledge and the first end being tapered diametrically outwardly from the outer diameter of the ledge to the inner diameter of the first opening of the first end of the hollow cylinder, the exterior of the cylinder in the region of the second opening being of lesser diameter than the diameter of the cylinder in the region of the first opening to thereby form a cylindrical protrusion with a circumferential groove around the protrusion; and a snap-lock pusher plate fitting in the groove.

11. In the apparatus of claim 10 including a stationary collar engaging said fitting adapted to hold the same when said cylinder is forced toward said fitting.

12. In the apparatus of claim 10 including a ram head abutting against the second end of said cylinder, said ram head having an aperture therethrough with said stem pusher extending through said aperture.

13. In the apparatus of claim 11 including a ram head abutting against the second end of said cylinder, said ram head having an aperture therethrough with said stem pusher extending through said aperture.

14. An expansion guide for fitting on an end of a hose to enable a fitting at an opposite end of the hose to be loosened characterized by a hollow cylinder having a large diameter exterior surface area and a narrow diameter exterior surface area open at both axial ends thereof to form first and second openings, the first opening at one end of the guide being circular and adapted to fit over the outer diameter of the hose, and the second opening at the other end of the guide being circular and of a diameter less than the diameter of the first opening, the interior of the hollow cylinder having an annular ledge therein, the ledge facing in the direction of the first opening and being adapted to abut the end of the hose, a cylindrical protrusion extending axially from the end of the hollow cylinder opposite the end having the first opening, the cylindrical protrusion having an outer diameter less than the outer diameter of the hollow cylinder, and an inner circular diameter equal to the diameter of the second opening located at the axial end of the cylindrical protrusion.

15. A guide as claimed in claim 14 wherein the protrusion has a circular groove around the circumference thereof.

16. A guide as claimed in claim 15 including a snap-lock pusher plate, which is adapted to removably fit within the circular groove.

17. A guide as claimed in claim 16 wherein the pusher plate has a hole therethrough of a diameter greater than the diameter of the protrusion, and is equipped with a yieldingly extendable snap-lock assembly which moves into a yielding lock position when the pusher plate is fitted over the circular groove in the protrusion.

18. A guide as claimed in claim 17 wherein the snap-lock assembly comprises a compression spring, a reciprocating pin, and a removable screw, which fit in a bore hole in the pusher plate, the pin extending into the hole in the pusher plate.

* * * * *